UNITED STATES PATENT OFFICE.

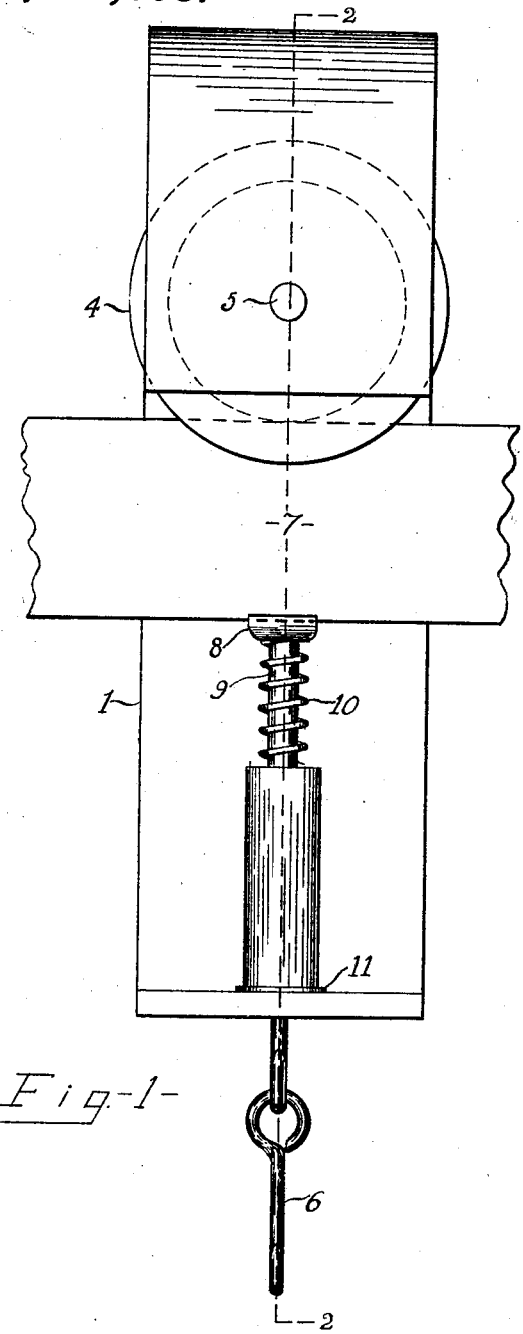
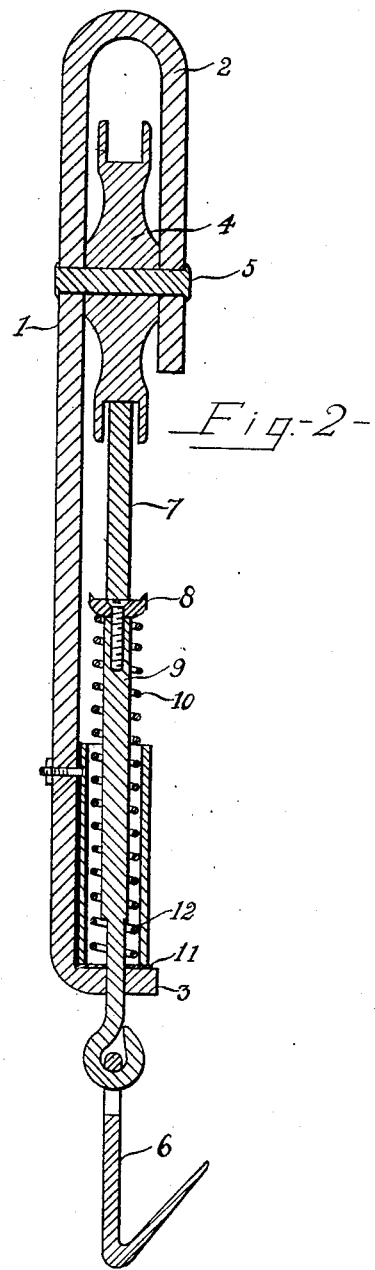

FRANKLIN D. BROGA, OF SYRACUSE, NEW YORK.

CARRIER OR TROLLEY.

1,383,383.  Specification of Letters Patent.  Patented July 5, 1921.

Application filed October 7, 1919. Serial No. 329,176.

*To all whom it may concern:*

Be it known that I, FRANKLIN D. BROGA, a citizen of the United States, and a resident of Syracuse, in the county of Onondaga and State of New York, have invented a certain new and useful Carrier or Trolley, of which the following is a specification.

This invention relates to traveling carriers such as are used in meat packing plants and aboard refrigerator cars and ships to support and convey carcasses or quarters, these carriers being usually called trolleys. The invention has for its object a particularly simple, efficient and durable means by which the trolley is automatically held onto the track when the load is being placed on and removed from the carrier and also when no load is on the carrier.

The invention consists in the novel features and in the combinations and constructions hereinafter set forth and claimed.

In describing this invention, reference is had to the accompanying drawings in which like characters designate corresponding parts in all the views.

Figure 1 is a front elevation of a preferable embodiment of my trolley, the contiguous portion of a rail or track being also shown.

Fig. 2 is a sectional view on line 2—2, Fig. 1.

This carrier or trolley comprises a frame, a trolley wheel carried by the frame for engaging a track, a member as a hook for supporting the load and means for automatically locking the trolley to the track, said means being connected to the load supporting member so that the locking means is held out of its operating position when the load is on the load supporting means and moves into its operative position while the load is being lifted off the load supporting member and also after the load is removed, so that injury to workmen due to falling of the trolley from the track is entirely eliminated.

The trolley, *per se* may be of any suitable form, size and construction and as here shown includes the usual frame 1 formed from a strip of metal having an end portion 2 bent downwardly upon itself to form a housing for the trolley wheel to be presently described, and having its other or lower end portion bent inwardly at 3 at a right angle to the body of the strip.

4 is a grooved trolley wheel mounted on a spindle 5 which is supported in suitable openings in the body of the strip and in the fold 2 thereof.

6 designates the load supporting member which is usually in the form of a hook, this hook being heretofore suspended directly from the lower end of frame 1 but in my trolley it is suspended from the means for holding the trolley from detachment from the track 7. Said means as here shown, includes a brake shoe 8 carried at the upper end of a plunger 9 and extended vertically through an opening in the flange 3 and below said flange 3 and being connected to the hook 6 in any suitable manner.

The brake 9 is arranged to engage the lower surface of the track directly below the trolley wheel 4 and is normally pressed into engagement with the track by a spring 10 encircling the plunger 9 and pressing at its lower end against the flange 3 or a washer 11 on the flange 3 and pressing at its upper end against the lower side of the brake shoe 8.

The plunger is usually provided with a downwardly facing shoulder 12 for engaging a flange 3 or the overlying washer 11 and hence preventing further compression of the spring after the brake 8 has been pulled away from the track 7.

In operation, while the workman is hanging a load as the carcass or a quarter of beef on the hook 6 the brake shoe 8 is held by the spring 10 against the lower side of the track or rail 7 and hence prevents both detachment of the trolley from the rail and also prevents movement of the trolley along the rail.

However, as soon as the workman releases the load so that it is supported on the hook 6, the hook pulls the plunger 9 downwardly until the shoulder 12 engages the washer 11, this movement pulling the brake shoe 8 away from the track 7 so that the trolley with the load thereon can be moved along the track to any desired location.

When the load is being removed and the weight thereof on the hook 6 is relieved when the workman is lifting the load, the brake 8 is pressed into engagement with the track 7 and again prevents the detachment of the trolley from the track. Hence all danger of the trolley falling from the track onto the workman is eliminated and the necessity of using two men to load and unload, one to lift the carcass and the other to hold the trolley on the track, is also eliminated.

What I claim is:

1. A carrier comprising a frame, a load carrying member depending from the frame and movable relatively thereto, and means for holding the trolley wheel on the track, said means being operable by the movement of said member, substantially as and for the purpose specified.

2. A carrier comprising a frame, a trolley wheel carried by the frame, a load supporting member movable relatively to the frame, and means for holding the trolley wheel on the track, said means normally coacting with the track and being connected to the load supporting member whereby the weight on the load supporting member holds said holding means away from the track, substantially as and for the purpose set forth.

3. A carrier comprising a frame, a trolley wheel, carried by the frame for engaging a track, means for carrying the load, and a brake for coacting with the track and connected to said means whereby the weight of the load holds the brake off the track, substantially as and for the purpose described.

4. A carrier comprising a frame, a trolley wheel carried by the frame for engaging the upper face of a track, a load supporting member below the trolley wheel, and a spring pressed brake for coacting with the lower side of the track and connected to the load supporting member whereby the weight of the load holds the brake off the track, substantially as and for the purpose specified.

5. A carrier comprising a frame, a trolley wheel carried by the frame for engaging the upper surface of the track, spring pressed means coacting with the track for holding the trolley wheel from displacement from the track, and a load supporting member connected to said means to normally hold the same in inoperative position against the action of its spring, substantially as and for the purpose set forth.

6. A carrier comprising a frame, a trolley wheel carried by the frame, an endwisely movable plunger having a brake surface arranged below and spaced apart from the trolley wheel, the plunger extending below the lower end of the frame, a spring encircling the plunger and abutting at its opposite end against the frame and against the plunger to press the plunger upwardly, and a load supporting member connected to the lower end of the plunger below the frame, substantially as and for the purpose described.

7. The combination with a track, of a carrier comprising a frame, a trolley wheel carried by the frame above the track in position to roll on the track, a vertically movable spring pressed plunger movable in the frame below the track toward and from the lower edge of the track, and a load supporting member connected to the lower end of the plunger, substantially as and for the purpose specified.

In testimony whereof, I have hereunto signed my name at Syracuse, in the county of Onondaga, and State of New York, this 30th day of August, 1919.

FRANKLIN D. BROGA.